(12) United States Patent
Tsuchida et al.

(10) Patent No.: US 7,102,396 B2
(45) Date of Patent: Sep. 5, 2006

(54) HYSTERESIS DETECTING METHOD, HYSTERESIS DETECTING CIRCUIT AND MOBILE DEVICE

(75) Inventors: Kazuhito Tsuchida, Kanagawa (JP); Kimitaka Benise, Kanagawa (JP)

(73) Assignee: Sony Corporation, Tokyo (JP)

( * ) Notice: Subject to any disclaimer, the term of this patent is extended or adjusted under 35 U.S.C. 154(b) by 16 days.

(21) Appl. No.: 10/939,423

(22) Filed: Sep. 14, 2004

(65) Prior Publication Data
US 2005/0057282 A1    Mar. 17, 2005

(30) Foreign Application Priority Data
Sep. 16, 2003   (JP)   ............................. 2003-323365

(51) Int. Cl.
*H03L 7/00*    (2006.01)
(52) U.S. Cl. ...................................... 327/143; 327/205
(58) Field of Classification Search ................ 324/143, 324/205, 206
See application file for complete search history.

(56) References Cited
U.S. PATENT DOCUMENTS
6,700,424 B1 *  3/2004  Feng ........................... 327/206

FOREIGN PATENT DOCUMENTS
JP    2002-111864    4/2002

* cited by examiner

Primary Examiner—Kenneth B. Wells
(74) Attorney, Agent, or Firm—Rader, Fishman & Grauer PLLC; Ronald P. Kananen

(57) ABSTRACT

A hysteresis detection method has two reference voltages Vref1, Vref2 relative to an input voltage Vin. It is determined whether the input voltage Vin becomes higher than or lower than the reference voltages Vref1, Vref2, and a judged result is outputted. In the initial stage in which the detection is started, regardless of the magnitude of the input voltage Vin, the reference voltage is fixed to any one of the reference voltages Vref1, Vref2. There are provided a hysteresis detecting method and a hysteresis detecting circuit in which, in the hysteresis detection having two reference voltages and which determines whether the input voltage is higher than or lower than the two reference voltages, one of the reference voltages can be judged and the judged result can be outputted regardless of the magnitude of the input voltage in the initial state in which the reference voltage is stabilized from the time in which the circuit is actuated. Also, there is provided a mobile device using this hysteresis detecting circuit.

4 Claims, 7 Drawing Sheets

HYSTERESIS DETECTING METHOD, HYSTERESIS DETECTING CIRCUIT AND MOBILE DEVICE

BACKGROUND OF THE INVENTION

1. Field of the Invention

The present invention generally relates to a hysteresis detecting method and a hysteresis detecting circuit applied to various kinds of electronic devices, and particularly to a hysteresis detecting method and a hysteresis detecting circuit suitable for detecting the intensity of illumination of mobile devices and to a mobile device including this hysteresis detecting circuit.

2. Description of the Prior Art

Recently, since various kinds of mobile devices, such as cell phones, are becoming smaller in size and lighter in weight and are driven by a battery power supply, it has been requested that they should be driven during a long duration with a small power consumption. A mobile device has a display unit (for example, a KEY display unit of a cell phone, etc.). This KEY display unit is energized by a backlight, customarily a light-emitting diode (LED), and becomes brighter. When the backlight of these mobile devices is energized, the backlight is kept brighter than the ambient illuminance necessitates, and it becomes a serious factor which deteriorates power consumption of the mobile device. For this reason, the mobile device uses an illuminance sensor to detect ambient illuminance and controls the KEY display unit to have the necessary intensity of illumination relative to ambient illuminance, thereby decreasing power consumption.

A circuit for detecting ambient illuminance to control a KEY display unit will be described below.

A circuit for controlling a KEY display unit is based upon a method in which an illuminance voltage, which results from converting a current flowing through an illuminance sensor in response to ambient illuminance by a resistor, and a reference voltage, set to the intensity of illumination to be detected, are compared with each other and in which a signal for energizing or de-energizing the KEY display unit based on a relationship between the magnitudes of the two voltages is used. That is, when the illuminance voltage is higher than the reference voltage, the ambient illuminance is higher than the intensity of illumination to be detected and hence the KEY display unit is de-energized. When the illuminance voltage is lower than the reference voltage, the ambient illuminance is lower than the intensity of illumination to be detected and hence the KEY display unit is energized. However, when the intensity of illumination is detected in actual practice, in order to prevent the KEY display unit from blinking in the state in which ambient illuminance near the intensity of illumination to be detected (that is, illuminance corresponding to a voltage close to the reference voltage) is inputted, a reference voltage is required to have hysteresis.

FIG. 1 of the accompanying drawings is a schematic diagram showing an example of a detecting circuit having hysteresis (hereinafter referred to as a "hysteresis detecting circuit") according to the prior art. As shown in FIG. 1, this hysteresis detecting circuit 41 is of the low power consumption type and comprises a differential amplifier 40, a switch 48 and a comparator (hereinafter referred to as a "comparator circuit") 43 composed of voltage supplying means 44, 45 for selectively switching the switch 48 to supply two reference voltages Vref1, Vref2 to the reference input terminal (positive input terminal) of the differential amplifier 40. An input voltage Vin to be compared is inputted to an input terminal (corresponding to the negative input terminal of the differential amplifier 40) of the comparator circuit 43. In FIG. 1, reference numeral 42 denotes a power supply.

Operations of this hysteresis detecting circuit 41 will be described next. As shown in FIG. 1, in the hysteresis detecting circuit 41, an input voltage Vin to be compared is inputted to the negative input terminal 46 of the comparator circuit 43. When the compared input voltage Vin becomes higher than the voltage values of the reference voltages Vref1, Vref2, the output voltage Vout outputted from the output terminal 47 of the comparator circuit 43 goes to a low level (Low). Conversely, when the compared input voltage Vin becomes lower than the voltage values of the reference voltages Vref1, Vref2, the output voltage Vout of the comparator circuit 43 goes to a high level (High). Also, the switch 48 inputs the low reference voltage Vref1 to the positive input terminal of the comparator circuit 43 when the output voltage Vout of low level (Low) is outputted from the output terminal 47, and it inputs the high reference voltage Vref1 to the positive input terminal of the comparator circuit 43 when the output voltage Vout of high level (High) is outputted from the output terminal 47.

Since the hysteresis detecting circuit 41 is formed of the low power consumption circuit arrangement, the reference voltages Vref1, Vref2 are slow to rise when the hysteresis detecting circuit 41 is actuated, and hence these reference voltages Vref1, Vref2 are stabilized slowly. As a result, when the hysteresis detecting circuit 41 is actuated, the compared input voltage Vin is stabilized earlier than the reference voltages Vref1, Vref2 and inputted to the comparator circuit 43. Thus, the output from the comparator circuit 43 is determined based on a relationship between the magnitudes of the reference voltages Vref1, Vref2 in the transient state and the input voltage Vin that has already been stabilized, whereby the reference voltages Vref1, Vref2 obtained when the hysteresis detecting circuit 41 is actuated are determined.

FIG. 2 shows the initial state attained when the compared input voltage Vin is inputted to the hysteresis detecting circuit 41 (shown in FIG. 1) in the state in which its level is lower than the levels of the reference voltages Vref1, Vref2. The initial state shows a period T1 from the detection start time, that is, the time at which the detection trigger pulse is outputted to the time at which the reference voltages Vref1, Vref2 are stabilized. When the aforementioned voltage is inputted to the hysteresis detecting circuit 41, since the compared input voltage Vin is higher than the reference voltages Vref1, Vref2 during the time period in which the hysteresis detecting circuit 41 is actuated to the point A, the output voltage Vout goes to the low level (Low) and the selector switch 48 inputs the low reference voltage Vref1 to the comparator circuit 43. However, after the point A, the relationship between the magnitudes of the voltages is reversed so that the output voltage Vout goes to the high level (High), and the selector switch 48 is allowed to input the high reference voltage Vref2 to the comparator circuit 43. That is, during a period Ta ahead of the point A, the selector switch 48 selects the reference voltage Vref1, and during a period Tb behind the point A, the selector switch 48 selects the reference voltage Vref2.

FIG. 3 shows the initial state of the reference voltage obtained when the compared input voltage Vin is inputted to the hysteresis detecting circuit 41 in the state in which its voltage level is higher than the voltage levels of the reference voltages Vref1, Vref2. When the aforementioned voltage is inputted to the hysteresis detecting circuit 41, depending upon the relationship between the magnitudes of the voltage in the transient state from the time period in which the hysteresis detecting circuit 41 is actuated to the time period in which the reference voltages Vref1, Vref2 are stabilized and the voltage of the compared input voltage Vin, the output voltage Vout obtained upon actuation of the hysteresis detecting circuit 41 goes to the low level (Low) and the selector switch 48 inputs the low reference voltage Vref1 to the comparator circuit 43 in the initial state. In FIG. 3, during a time period Tc from the actuation of the hysteresis detecting circuit 41 to the time in which the reference voltage is stabilized, the selector switch 48 selects the reference voltage Vref1.

FIG. 4 shows the initial state of a threshold voltage obtained when the compared input voltage Vin is inputted to the hysteresis detecting circuit 41 in the state in which its voltage level lies between the low reference voltage Vref1 and the high reference voltage Vref2. When the aforementioned voltage is inputted to the hysteresis detecting circuit 41, depending upon the relationship between the magnitudes of the voltage in the transient state obtained until the reference voltages Vref1, Vref2 are stabilized after the hysteresis detecting circuit 41 has been actuated and the voltage of the compared input voltage Vin, the output voltage Vout obtained upon actuation of the hysteresis detecting circuit 41 goes to the low level (Low) and the selector switch 48 inputs the low reference voltage Vref1 to the comparator circuit 43 in the initial state.

An illuminance detecting circuit using the above-mentioned hysteresis detecting circuit 41 shown in FIG. 1 will be described next in detail with reference to FIG. 5, in which case a flip-type cell phone is taken as an example.

A flip-type cell phone that is required to consume small power need not energize the KEY display unit in the state in which it is in the closed state (when it is not in use). Thus, when the flip-type cell phone is closed, a power supply voltage is not supplied to the hysteresis detecting circuit that uses the same voltage as that supplied to the KEY display unit. Therefore, in general, at the same time the flip-type cell phone is opened (when it is in use), the power source voltage is supplied to the cell phone to energize the KEY display unit and the hysteresis circuit 41 is actuated. For example, when the intensity of illumination of 100 lux and the intensity of illumination of 150 lux are detected by the hysteresis detecting circuit 41, the low reference voltage Vref1 is set to correspond to 100 lux and the high reference voltage Vref2 is set to correspond to 150 lux. Then, when the output signal from the hysteresis detecting circuit 41 is held at the high level (High), the KEY display unit is energized. When the output signal from the hysteresis detecting circuit 41 is held at the low level (Low), the KEY display unit is deenergized, and hence the KEY display unit can be controlled relative to the ambient illuminance under the circumstances in which the cell phone is in use. It is requested by users that the KEY display unit may be energized at an intensity of illumination lower than 100 lux and that it may be de-energized at an intensity of illumination higher than 150 lux. Also, it is requested that the KEY display unit should be energized only when the cell phone is actuated because the intensity of illumination from 100 to 150 lux changes in response to differences among individuals.

In an illuminance detecting circuit 51 shown in FIG. 5, an illuminance detecting means 56 for detecting ambient illuminance is connected to the input terminal 46 of the comparator circuit 43 in addition to the aforementioned hysteresis detecting circuit 41. The illuminance detecting means 56 is composed of an illuminance sensor 53 formed of a photo-diode, for example, a resistor (R1) 55 connected in series to the illuminance sensor 53 and a capacitance (C1) 54 connected in parallel to the resistor (R1) 55. A connection point between the illuminance sensor 53 and the resistor (R1) 55 is connected to the input terminal 46 of the comparator circuit 43. In FIG. 5, reference numeral 57 denotes a power source of the illuminance sensor 53.

In the illuminance detection and control operations of the illuminance detecting circuit 51 shown in FIG. 5, when the cell phone is opened (when the cell phone is in use) in a place where the ambient illuminance is less than 100 lux, a current corresponding to the ambient illuminance flows from the illuminance sensor 53 to the capacitance (C1) 54 and the resistor (R1) 55, and the voltage Vin corresponding to the intensity of illumination is inputted from the input terminal 46 to the comparator circuit 43. The initial state of the input voltage Vin becomes the high reference voltage Vref2 corresponding to 150 lux based upon the relationship between the magnitudes of the input voltage Vin and the reference voltages Vref1, Vref2 in the transient state. Thus, the illuminance detecting circuit 51 can judge that the ambient illuminance is lower than the intensity of illumination to be detected and can energize the KEY display unit in the way the user wants.

When the cell phone is opened (when the cell phone is in use) in a place where the ambient illuminance is higher than 150 lux, a current corresponding to the ambient illuminance flows from the illuminance sensor 53 to the capacitance (C1) 54 and the resistor (R1) 55, and the voltage Vin corresponding to the intensity of illumination is inputted from the input terminal 46 to the comparator circuit 43. The initial state of the reference voltage becomes the low reference voltage Vref1 corresponding to 100 lux based upon the relationship between the magnitudes of the input voltage Vin and the reference voltages Vref1, Vref2 in the transient state. Thus, the illuminance detecting circuit 51 can judge that the ambient illuminance is higher than the intensity of illumination detected and it can deenergize the KEY display unit in the way the user wants.

Next, when the cell phone is opened (when the cell phone is in use) in a place where the ambient illuminance lies in a range of from 100 to 150 lux, a current corresponding to the ambient illuminance flows from the illuminance sensor 53 to the capacitance (C1) 54 and the resistor (R1) 55, and the voltage corresponding to the intensity of illumination is inputted from the input terminal 46 to the comparator circuit 43. However, since the reference voltages Vref1, Vref2 are slow to rise upon actuation, based upon the relationship between the magnitudes of the input voltage Vin and the reference voltages Vref1, Vref2 in the transient state, the initial state of the reference voltage becomes the low reference voltage Vref1 corresponding to 100 lux. Consequently, the illuminance detecting circuit 51 can judge that the ambient illuminance is higher than the intensity of illumination to be detected. Thus, as shown in FIG. 6, a de-energizing signal P1 containing the initial state is outputted from the output terminal 47 to deenergize the KEY display unit so that the KEY display unit cannot be energized in the way the user wants.

Cited patent reference 1 has described an example of a mobile-device terminal apparatus including an illumination control mechanism.

[Cited patent reference 1]: Official gazette of Japanese laid-open patent application No: 2002-111864

The KEY display unit can be energized in the way the user wants under control of a central processing unit (CPU) as shown in FIG. 7. In FIG. 7, elements and parts identical to those of FIG. 5 are denoted by the identical reference numerals.

As shown in FIG. 7, an illuminance detecting circuit 61 includes the aforementioned hysteresis detecting circuit 41 and the aforementioned illuminance detecting means 56 in which the switch 48 for selecting the reference voltages is controlled by a central processing unit (CPU) 62 incorporated within the cell phone. More specifically, the CPU 62 incorporated within the cell phone can determine whether the cell phone is actuated or whether it is in use. When the cell phone is actuated, the reference voltage set by the switch 48 is constantly set to the high reference voltage Vref2 corresponding to 150 lux under control of the CPU 62. Next, it is determined by the CPU 62 that the output voltage Vout of the comparator circuit 43 is at the high level (High) (that is, when the input voltage Vin is lower than the reference voltages Vref1, Vref2) after a constant time in which the reference voltages Vref1, Vref2 are stabilized since they were actuated, as shown in FIG. 8 (when the input voltage Vin lies between the reference voltages Vref1 and Vref2), and the CPU 62 sets the input voltage to the high reference voltage Vref2 corresponding to 150 lux in the same way as the cell phone is actuated. If it is determined by the CPU 62 that the output voltage Vout of the comparator circuit 43 is held at the low level (Low), as shown in FIG. 10 (when the input voltage Vin is higher than the reference voltages Vref1, Vref2), the CPU 62 sets the switch 48 to the low reference voltage Vref1 corresponding to 100 lux. Also, before the aforementioned constant time t1 passes (that is, the period Td), the CPU 62 outputs the high level (High) voltage as the control signal for energizing or deenergizing the KEY input unit of the cell phone. After the constant time t1 passed (that is, the period Te), the CPU 62 outputs the outputted results of the comparator circuit 62 as the control signal for energizing or de-energizing the KEY display unit of the cell phone. After this, if it is determined by the CPU 62 that the cell phone is in use and then at the same time the output from the comparator circuit 43 is switched, the switch 48 is switched based on an output signal Hys from the CPU 62 to thereby switch the reference voltages Vref1, Vref2 inputted to the comparator circuit 43. When the control signal outputted from the CPU 62 is held at the low level (Low), the KEY display unit is deenergized. When, on the other hand, the above control signal is held at the high level (High), the KEY display unit is energized, whereby the KEY display unit is energized in the way the user wants even in a place where the ambient luminance obtained upon actuation falls within a range of from 100 to 150 lux.

As described above, in the hysteresis detecting circuit according to the prior art, when the compared input voltage is lower than the two reference voltages or when the compared input voltage lies between the two reference voltages, in the initial state from the actuation time to the time until the reference voltage is stabilized, a problem arises, in which the compared input voltage becomes higher than the reference voltage. In order to solve this problem, there is required a terminal for controlling a large-scaled system, such as a CPU, and a reference voltage from the outside. When the CPU or the like is used, it is natural that the circuit arrangement becomes more complex and that its power consumption increases.

In the hysteresis detecting circuit applied to electronic devices such as a mobile device, it can be assumed that the high level and the low level of the output from the comparator circuit will be inverted.

SUMMARY OF THE INVENTION

In view of the aforesaid aspects, it is an object of the present invention to provide a hysteresis detecting method; a hysteresis detecting circuit, in which in the hysteresis detection having two reference voltages to determine whether an input voltage is higher or lower than the two reference voltages and to output the judged result, a small-scale and low-power-consumption circuit arrangement can be maintained, and one of the judged results can be outputted regardless of the magnitude of the input voltage in the initial state from the actuation to the time in which the reference voltages are stabilized; and a mobile device using this hysteresis detecting circuit.

According to an aspect of the present invention, there is provided a hysteresis detecting method that has two reference voltages and that judges two values relative to an input voltage. This hysteresis detecting method is comprised of the step of fixing a reference voltage to any one of the two reference voltages regardless of the magnitude of the input voltage in the initial state until the reference voltage is stabilized from the energized time point.

According to the hysteresis detecting method of the present invention, since the reference voltage is fixed to any one of the reference voltages regardless of the magnitude of the input voltage in the initial state in which the hysteresis detection is started, it is possible to output the stable judged result from the start of the detection.

According to another aspect of the present invention, there is provided a hysteresis detecting circuit having two reference voltages and which outputs results obtained when two values are judged relative to an input voltage. This hysteresis detecting circuit is comprised of a control means for fixing the reference voltage to any one of the two reference voltages regardless of the magnitude of the input voltage in the initial state until the reference voltage is stabilized from the energized time point.

According to the hysteresis detecting circuit of the present invention, since the reference voltage is fixed to any one of the reference voltages regardless of the magnitude of the input voltage in the initial state in which the hysteresis detection is started, it is possible to output the stable judged result from the start of the detection.

In accordance with a further aspect of the present invention, there is provided a mobile device which is comprised of a comparing circuit, having two reference voltages and which outputs results obtained when two values are judged relative to an input voltage, a delay circuit for delaying an input voltage to the comparing circuit and a control circuit for fixing the reference voltage to any one of the two reference voltages (regardless of the magnitude of the input voltage in the initial state) until the reference voltage is stabilized from the energized time point.

Since the mobile device according to the present invention includes the hysteresis detecting circuit for fixing the reference voltage to any one of the reference voltages regardless of the magnitude of the input voltage in the early stage in which detection of hysteresis is started, it is possible to place the mobile device in the normal state once the mobile device starts to be energized in use.

According to the hysteresis detecting method of the present invention, since the hysteresis detecting operation can be carried out so that the reference voltage in the initial state has to be fixed to any one of the reference voltages regardless of the magnitude of the input voltage required when the device is actuated, the present invention is suitable for use with electronic devices that are required to be small in power consumption, in particular, mobile devices. The initial period is set to the period in which the reference voltage is stabilized from the time in which the mobile device is actuated, whereby the hysteresis detection operation can be carried out reliably.

According to the hysteresis detecting circuit of the present invention, since the hysteresis detecting circuit can be constructed so that the reference voltage in the initial state has to be fixed to any one of the reference voltages regardless of the magnitude of the input voltage required when the device is actuated, the present invention is suitable for use with electronic devices that are required to be small in power consumption, in particular, mobile devices.

Since the hysteresis detecting circuit according to the present invention includes the comparing circuit having the two reference voltages and the delay circuit for delaying the input of the input voltage to the comparing circuit, the delay time is set to the time in which the reference voltage is stabilized from the time in which the electronic device is actuated, whereby the initial reference voltage can be fixed to any one of the reference voltages.

The initial period is set to the period in which the reference voltage is stabilized from the time in which the mobile device is actuated, whereby the hysteresis detection operation can be carried out reliably.

According to the mobile device of the present invention, since this mobile device includes the above-described hysteresis detecting circuit, the intensity of illumination, for example, can be detected with high accuracy and hence it can meet with user's requirements.

DESCRIPTION OF THE PREFERRED EMBODIMENTS

The present invention will now be described with reference to the drawings in detail.

Figure 1:
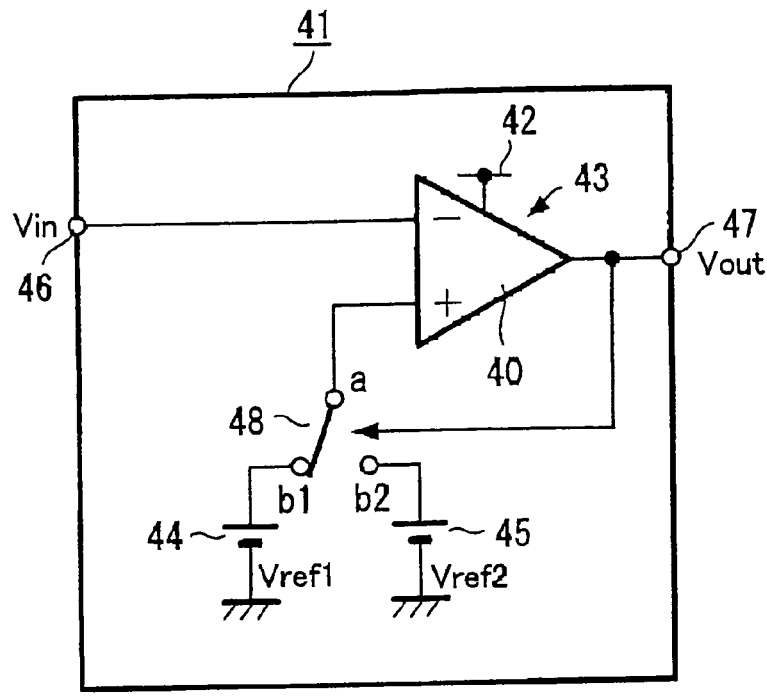
FIG. 1 is a schematic diagram showing a hysteresis detecting circuit according to the prior art.
Figure 2:
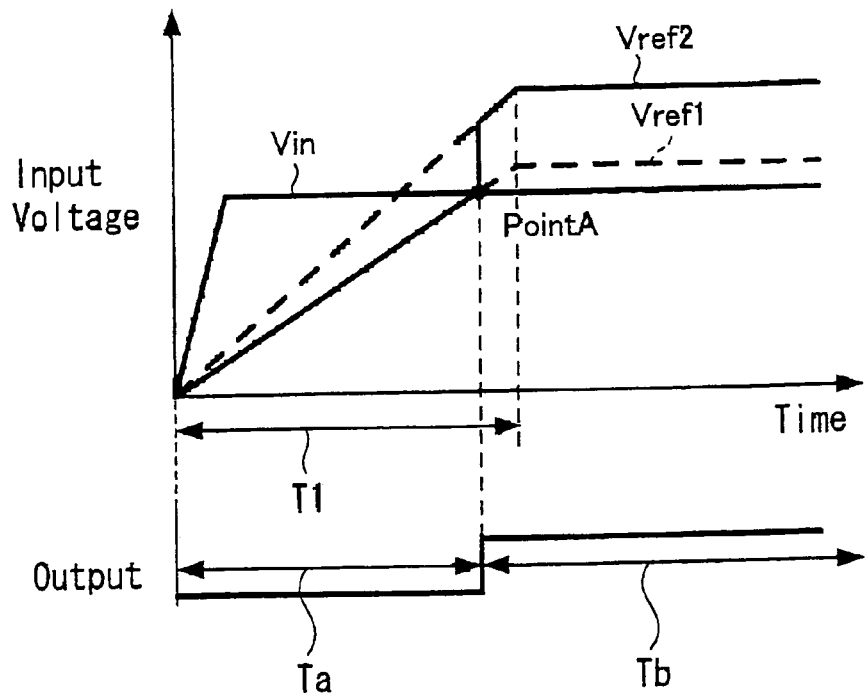
FIG. 2 is a diagram showing a graph of an input voltage of an illuminance detecting circuit shown in FIG. 1 and a rising time and a graph correlating to the above graph and which shows an output voltage Vout of the hysteresis detecting circuit.
Figure 3:
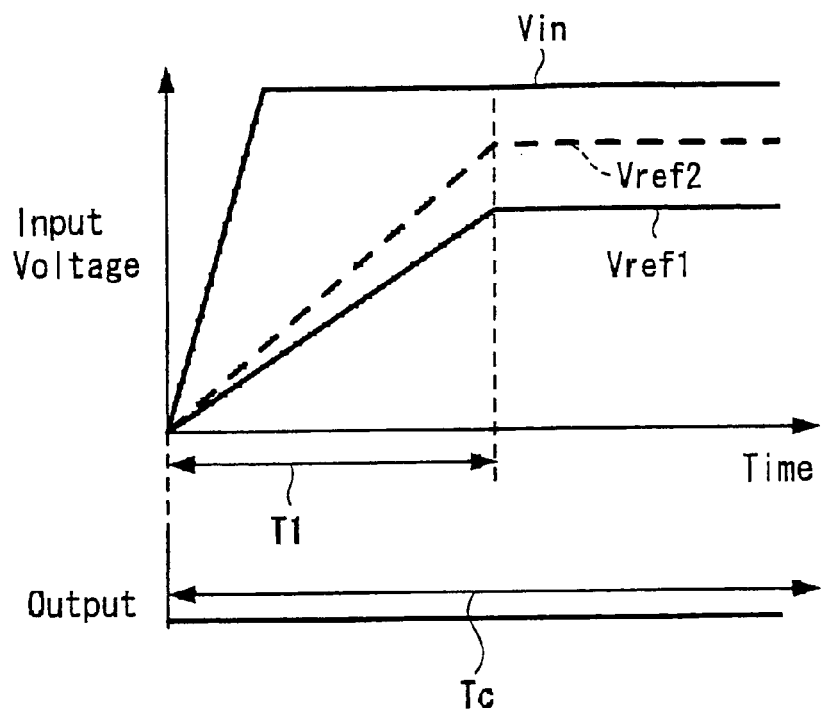
FIG. 3 is a diagram showing a graph of an input voltage of an illuminance detecting circuit shown in FIG. 1 and a rising time and a graph correlating to the above graph and which shows an output voltage Vout of the hysteresis detecting circuit.
Figure 4:
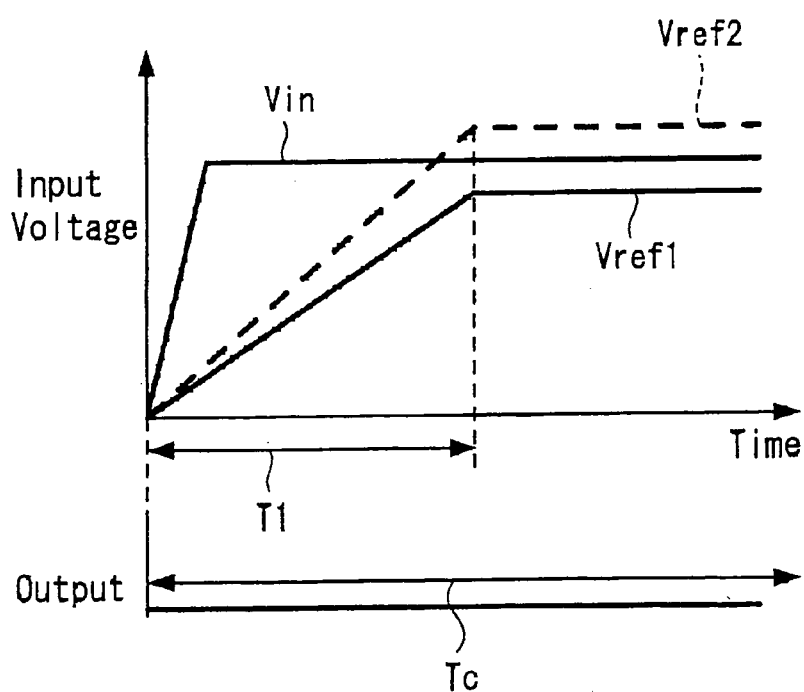
FIG. 4 is a diagram showing a graph of an input voltage of an illuminance detecting circuit shown in FIG. 1 and a rising time and a graph correlating to the above graph and which shows an output voltage Vout of the hysteresis detecting circuit.
Figure 5:
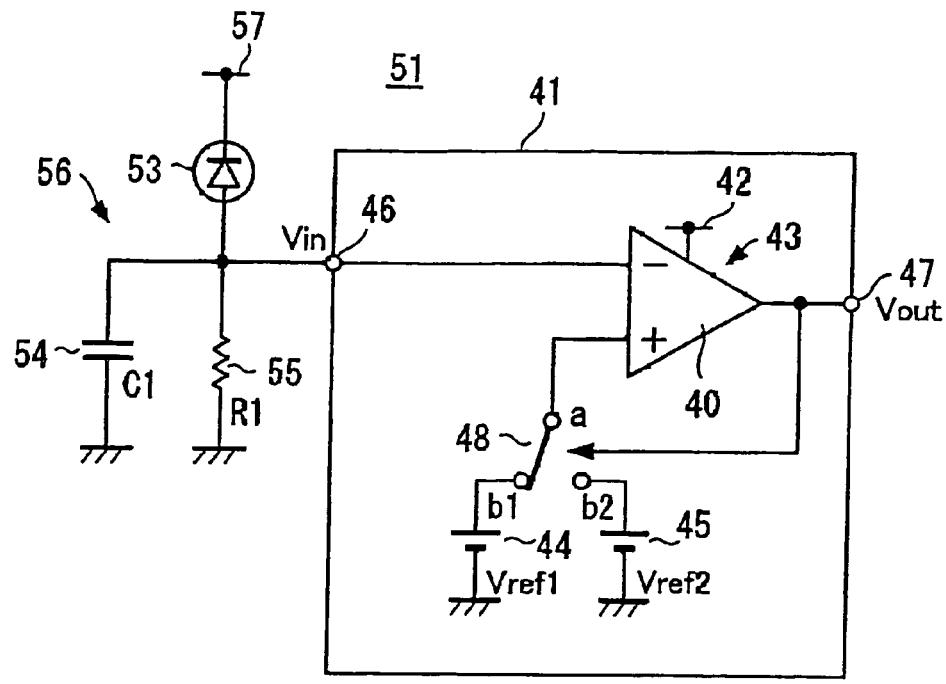
FIG. 5 is a circuit diagram of an illuminance detecting circuit using the hysteresis detecting circuit according to the related art.
Figure 6:
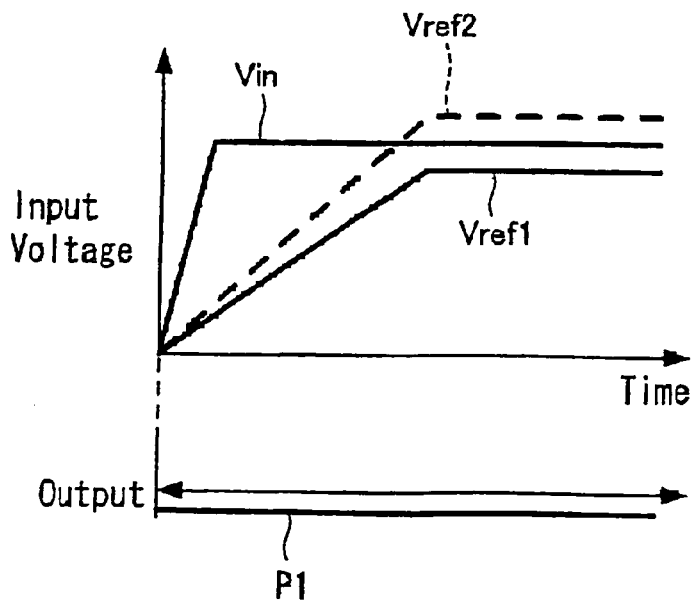
FIG. 6 is a diagram showing a graph of an input voltage of an illuminance detecting circuit shown in FIG. 5 and a rising time and a graph correlating to the above graph and which shows an output voltage Vout of the hysteresis detecting circuit.
Figure 7:
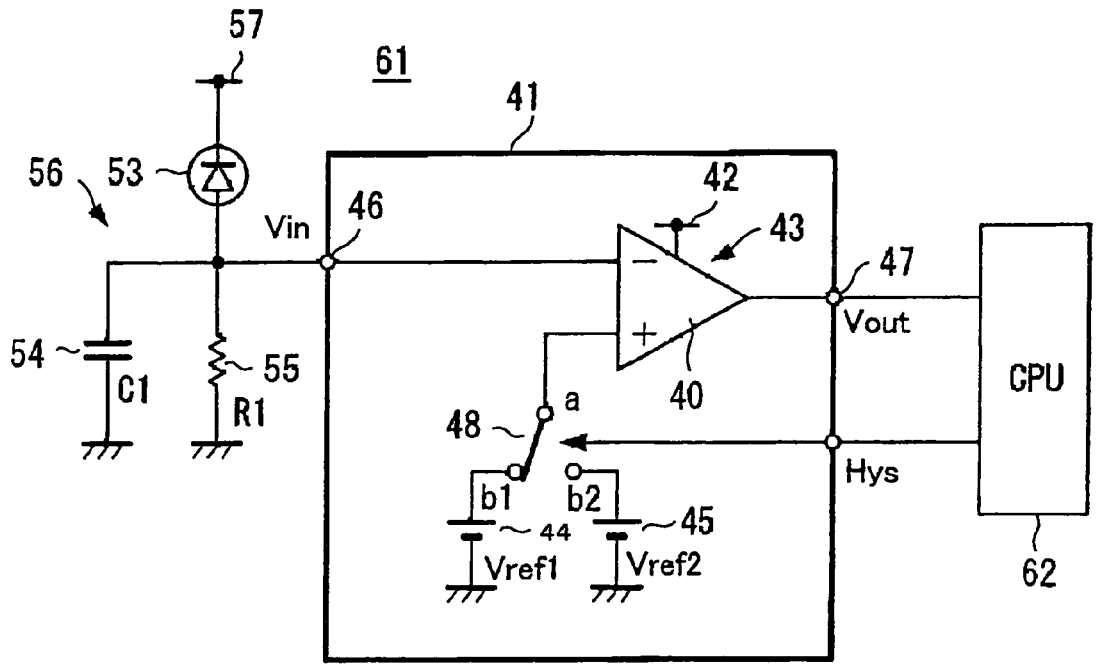
FIG. 7 is a circuit diagram of an illuminance detecting circuit using a CPU (central processing unit) as a hysteresis detecting circuit according to the related art.
Figure 8:
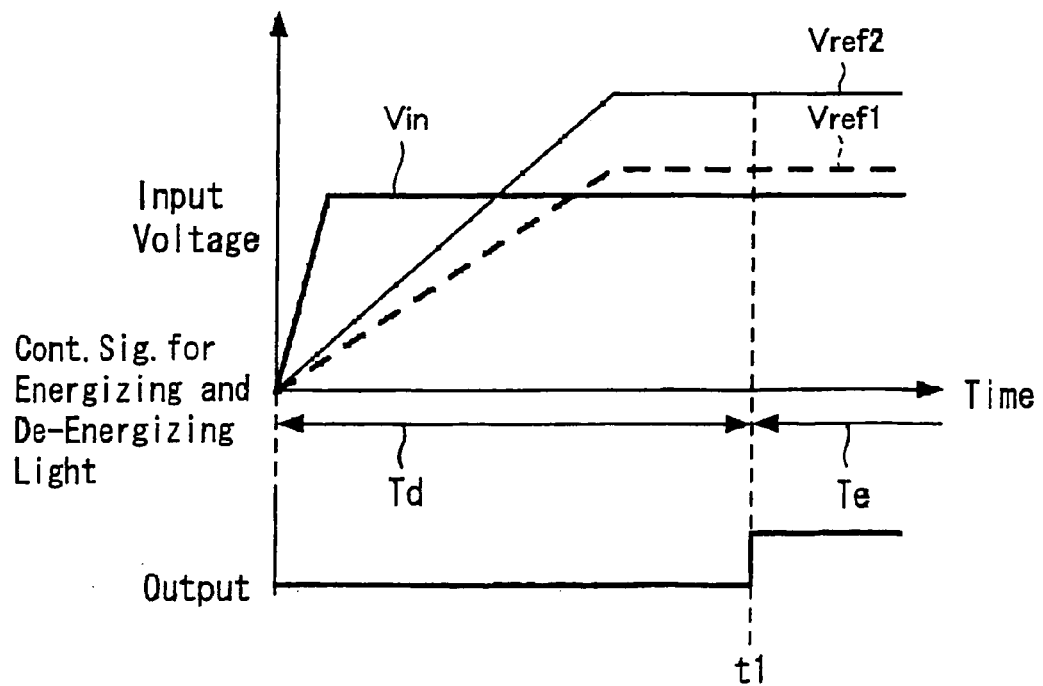
FIG. 8 is a diagram showing a graph of an input voltage of the illuminance detecting circuit shown in FIG. 7 and a rising time and a graph correlating to the above graph and which shows an output voltage Vout of the hysteresis detecting circuit.
Figure 9:
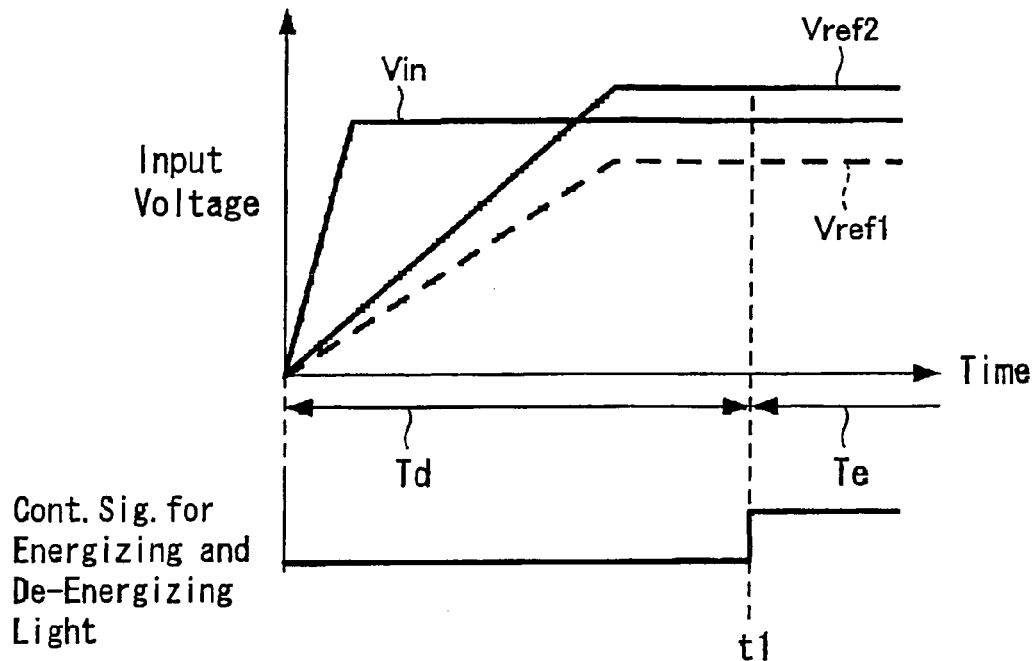
FIG. 9 is a diagram showing a graph of an input voltage of the illuminance detecting circuit shown in FIG. 7 and a rising time and a graph correlating to the above graph and which shows an output voltage Vout of the hysteresis detecting circuit.
Figure 10:
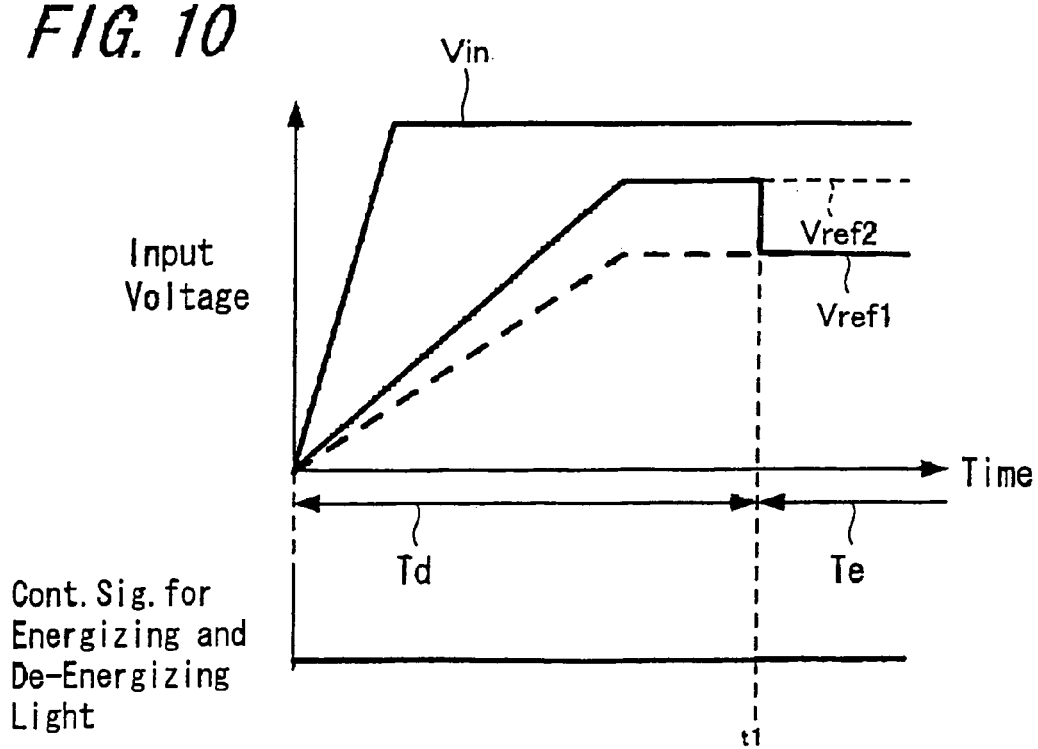
FIG. 10 is a diagram showing a graph of an input voltage of the illuminance detecting circuit shown in FIG. 7 and a rising time and a graph correlating to the above graph and which shows an output voltage Vout of the hysteresis detecting circuit.
Figure 11:
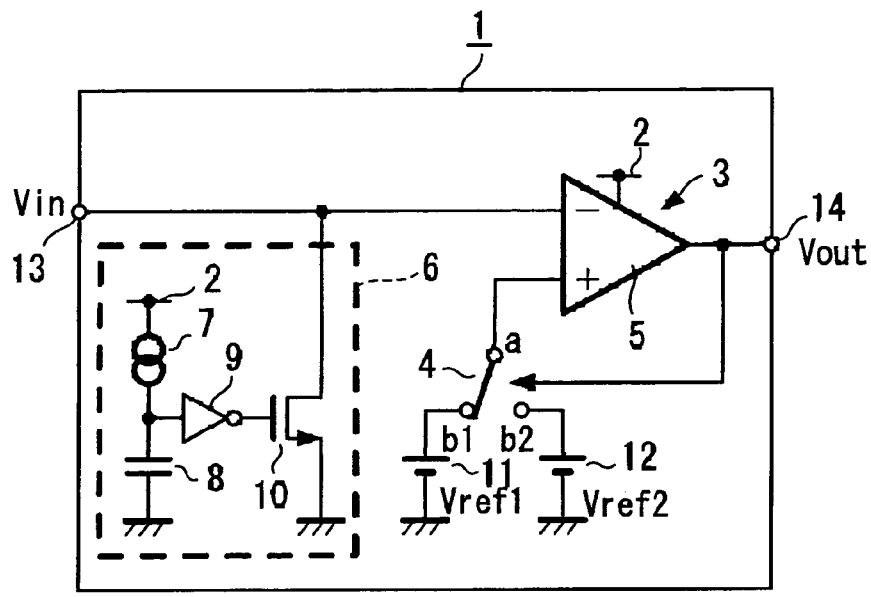
FIG. 11 is a circuit diagram showing a hysteresis detecting circuit according to an embodiment of the present invention.

FIG. 11 is a circuit diagram showing a hysteresis detecting method and a hysteresis detection circuit according to an embodiment of the present invention.

As shown in FIG. 11, a hysteresis detecting circuit 1 according to the embodiment of the present invention is composed of a comparator circuit 3 comprising a differential amplifier 5, two voltage supplying means 11, 12 for inputting two reference voltages Vrefr1, Vref2 to the differential amplifier 5 and a switch 4 for switching the two reference voltages Vref1, Vref2 and a delay circuit 6 for delaying the input of an input voltage (that is, compared voltage) Vin to be inputted to the comparator circuit 3 by a predetermined time. The switch 4 has a fixed contact a connected to the positive input terminal of the differential amplifier 5 and also has movable contacts b1, b2 that are respectively connected to the voltage supply means 11, 12. The switch 4 is changed-over under control of an output voltage from the comparator circuit 3 (accordingly, output voltage of the differential amplifier 5). This switch 4 selectively supplies the reference voltage Vref1 or Vref2 to the positive input terminal of the differential amplifier 5. A power supply 2 is connected to the differential amplifier 5. The compared input voltage Vin is inputted through an input terminal 13 to the negative input terminal of the differential amplifier 5. Also, the output voltage Vout of the comparator circuit 3 is outputted to the outside through an output terminal 14.

The delay circuit 6 is composed of a constant current source 7 and a capacitance 8 connected in series between the power supply 2 and the ground (GND), an n-channel MOS (metal-oxide semiconductor) transistor 10 and an inverter circuit 9 connected between the connection point between the constant current source 7 and the capacitance 8 and the gate electrode of the n-channel MOS transistor 10. The drain of the n-channel MOS transistor 10 is connected to the negative input terminal of the differential amplifier 5 and the source thereof is connected to the ground (GND).

Operations of the hysteresis detecting circuit 1 according to this embodiment will be described.

As shown in FIG. 11, the power source voltage is supplied from the power supply 2 to the comparator circuit 3 and the delay circuit 6, whereby the hysteresis detecting circuit 1 is actuated. The compared input voltage Vin is inputted to the input terminal 13. In the delay circuit 6, at the time in which the hysteresis detecting circuit 1 is actuated, the input voltage of the inverter circuit 9 is held at a low level so that the inverted high output voltage is applied to the gate electrode of the n-channel MOS transistor 10, thereby resulting in the n-channel MOS transistor 10 being turned on. As a result, regardless of the magnitude of the input voltage Vin, the ground potential is inputted to the negative input terminal of the differential amplifier 5 of the comparator circuit 3. After the hysteresis detecting circuit 1 has been actuated, a bias current that flows through the constant current source 7 is charged into the capacitance 8 and the input voltage of the inverter circuit 9 is raised, whereby the inverted output voltage is lowered. In consequence, the gate voltage of the n-channel MOS transistor 10 which short-circuits the input terminal 13 of the input voltage Vin and the ground (GND) is lowered and the n-channel MOS transistor 10 is turned off, thereby resulting in the drain and the source being opened. Accordingly, the input voltage 13 applied to the input terminal 13 is inputted to the negative input terminal of the differential amplifier 5 in the comparator circuit 3. The delay time of the delay circuit 6 corresponds to a time during which a bias current is charged into the capacitance 8. This delay time of the delay circuit 6 is set to a predetermined time from the start of the actuation of the hysteresis detecting circuit 1, that is, from the start of the actuation to the time at which the reference voltages Vref1, Vref2 are stabilized.

When the delay circuit 6 is operated as described above, even though the reference voltages Vref1, Vref2 are slow to rise because the mobile device is of the low-power-consumption type, the stabilized reference voltages Vref1, Vref2 can be inputted to the comparator circuit 3 during the delay time in which the input voltage Vin is inputted to the comparator circuit 3. As a consequence, regardless of the magnitude of the input voltage Vin, in the initial state, the input voltage Vin is constantly kept lower than the reference voltages Vref1, Vref2. Based upon the relationship between the magnitudes of the input voltage Vin and the reference voltages Vref1, Vref2, the initial state of the output voltage Vout goes to the high level (High) and the high reference voltage Vref2 is supplied through the switch 4 to the comparator circuit 3 so that, when the hysteresis detecting circuit 1 is actuated, the input voltage is constantly set to the high reference voltage Vref2 regardless of the magnitude of the input voltage Vin. After the reference voltages Vref1, Vref2 have been stabilized, the input voltage Vin and the reference voltage Vref1 or Vref2 are compared with each other by the comparator circuit 3, and the comparator circuit 3 outputs the compared result of the two values based on the relationship between the magnitudes of the input voltage Vin and the reference voltage Vref1 or Vref2.

According to the hysteresis detecting method and the hysteresis detecting circuit of the present invention, when the input voltage Vin compared when the hysteresis detecting circuit is actuated is lower than the two reference voltages Vref1, Vref2 or it is equal to a voltage between the two reference voltages Vref1 and Vref2, it is possible to avoid having the input voltage set to the low reference voltage Vref1 in the initial state. As a consequence, it is possible to realize a small-scale and low-power-consumption circuit arrangement without using a CPU and the like. According to this embodiment, regardless of the magnitude of the input voltage required when the hysteresis detecting circuit is actuated, the present invention can be used to detect hysteresis that requests the initial reference voltage to be fixed. For example, the hysteresis detecting method and the hysteresis detecting circuit according to this embodiment are suitable for use with a mobile device, such as the cell phone, that is requested to consume a small amount of power.

While the hysteresis detecting method and the hysteresis detecting circuit according to the embodiment of the present invention can be applied to detection of the intensity of illumination of the mobile device, they also can be applied to the case in which the judged result of two values in various values of other electronic devices is outputted.

Next, the embodiment in which the illuminance detection and control operation, using the hysteresis detecting circuit 1 shown in FIG. 11 according to this embodiment, is applied to a flip-type cell phone will be described with reference to FIGS. 12 and 13.

Figure 12:
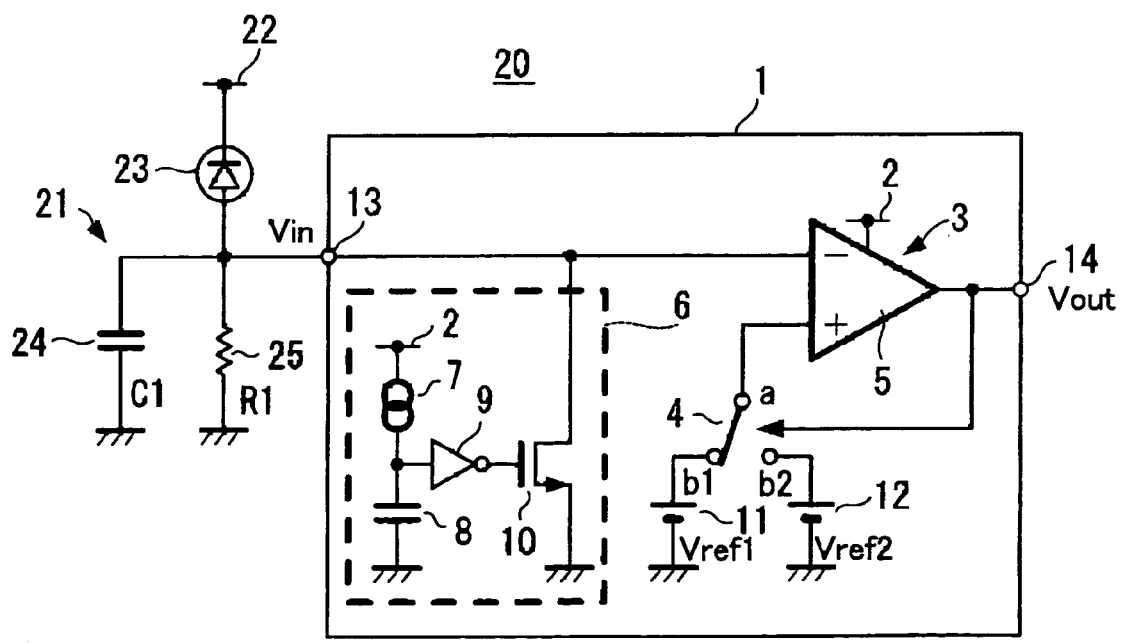
FIG. 12 is a circuit diagram showing an illuminance detecting circuit using the hysteresis detecting circuit according to an embodiment of the present invention.

FIG. 12 is a circuit diagram showing a circuit arrangement of an illuminance detecting circuit that is applied to the flip-type cell phone according to the embodiment of the present invention. As shown in FIG. 12, an illuminance detecting circuit 20 according to this embodiment is composed of the hysteresis detecting circuit 1 shown in FIG. 11 and an illuminance detecting means 21, which detects the ambient illuminance, connected to the input terminal 13 of the hysteresis detecting circuit 1. As shown in FIG. 12, similarly as described above, the illuminance detecting means 21 is composed of an illuminance sensor 23 formed of a photo-diode, for example, a resistor (R1) 25 connected in series to the illuminance sensor 23 and a capacitance (C1) 24 connected in parallel to the resistor (R1) 25, and the connection point between the illuminance sensor 23 and the resistor (R1) 25 is connected to the input terminal 13. One end of the illuminance sensor 23 is connected to a power supply 22 and the other ends of the capacitance 24 and the resistor 25 are connected to the ground (GND).

Let it now be assumed that the illuminance detected by the illuminance detecting means 21 lies between 100 lux and 150 lux. When the intensity of illumination is lower than 100 lux, it is judged by the user that the intensity of illumination is low and the user energizes the KEY display unit. When the intensity of illumination is higher than 150 lux, it is judged by the user that the intensity of illumination is high and the user deenergizes the KEY display unit. Since users have differences in sensitivity relative to the intensity of illumination ranging of from 100 lux to 150 lux, it is desired that the KEY display unit should be energized only when the cell phone is actuated.

As shown in FIG. 12, whena flip-type cell phone is opened (when the cell phone is in use) in a place where the ambient illuminance lies in a range of from 100 lux to 150 lux, the power supply voltage is supplied from the power supply 2 to the KEY display unit and, at the same time, the power supply voltage is supplied from the power supply 2 to the hysteresis detecting circuit 1. Next, in the hysteresis detecting circuit 1, similarly as described above, a current corresponding to the ambient illumination flows from the illuminance sensor 23 to the capacitance (C1) 24 and the resistor (R1) 25, and the voltage corresponding to the intensity of illumination is inputted to the input terminal 13. Alternatively, in the delay circuit 6, a bias current which flows through the constant current source 7 when the cell phone is actuated is charged into the capacitance 8 and the input voltage of the inverter circuit 9 is raised. Next, the gate voltage of the n-channel MOS transistor 10 that has been placed in the on-state is lowered as the input voltage of the inverter circuit 9 is raised and the n-channel MOS transistor 10 is turned off. More specifically, the gate voltage of the n-channel MOS transistor 10 that has short-circuited the input terminal 13 and the ground (GND) is lowered, whereby the path between the drain and the source is opened to allow the input voltage Vin to be inputted to the comparator circuit 3.

When the delay circuit 6 is operated as described above, even though the reference voltages Vref1, Vref2 are slow to rise because the mobile device is of the low-power-consumption type, the reference voltage Vref1 or Vref2 can be inputted to the comparator circuit 3 within the delay time during which the input voltage Vin is inputted to the input terminal 13. Consequently, regardless of the magnitude of the input voltage Vin, in the initial state, the input voltage Vin is constantly kept lower than the reference voltages Vref1, Vref2. Thus, the initial state of the output voltage Vout goes to the high level (High) in order to set the reference voltage to the high reference voltage Vref2 constantly when the cell phone is actuated. Therefore, when the signal outputted from the comparator circuit 3 is held at the low level (Low), the KEY display unit can be deenergized, and when the signal outputted from the comparator circuit 3 is held at the high level (High), the KEY display unit can be energized.

Figure 13:
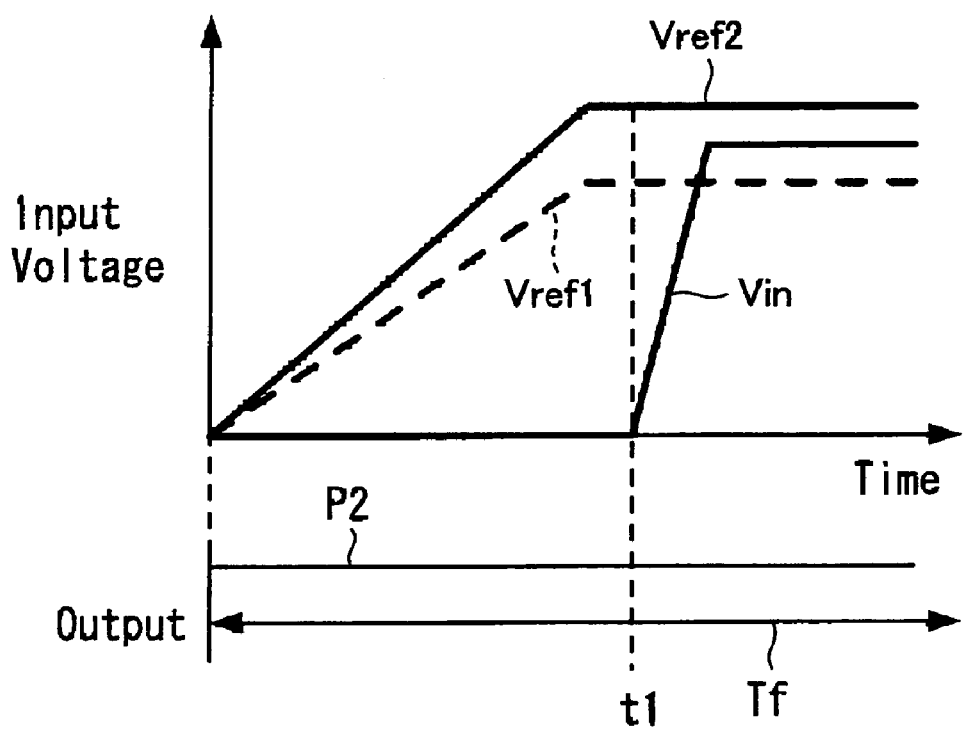
FIG. 13 is a diagram showing a graph of an input voltage of the illuminance detecting circuit shown in FIG. 12 and a rising time and a graph correlating to the above graph and which shows an output voltage Vout of the hysteresis detecting circuit.

More specifically, operations for energizing the KEY display unit at the intensity of illumination ranging from 100 lux to 150 lux when the cell phone is actuated, in which energizing is the problem encountered with the related art, can be realized by fixing the reference voltage to the high reference voltage (Vref2) when the cell phone is actuated as shown in FIG. 13. That is, as shown in FIG. 13, in the initial state up to the time t1 in which the reference voltages Vref1, Vref2 are stabilized, the input voltage Vin is fixed to the ground potential and the input voltage Vin to be compared after the reference voltages Vref1, Vref2 have been stabilized is inputted to the comparator circuit 3. As shown in FIG. 13, an energizing signal P2 is outputted over a period Tf ranging from the actuation of the cell phone to the time in which the reference voltages Vref1, Vref2 are stabilized. Accordingly, when the compared input voltage Vin is the voltage between the reference voltages Vref1 and Vref2, the reference voltage is kept fixed to the high reference voltage Vref2, and hence the energizing signal P2 is outputted from the illuminance detecting circuit 20.

Also, in the illuminance detecting circuit 20 according to this embodiment, even when the compared input voltage Vin is lower than the reference voltages Vref1, Vref2, in the initial state, the input voltage Vin is fixed to the ground potential, and hence the energizing signal P2 is outputted from the illuminance detecting circuit 20.

While the initial reference voltage is fixed to the high reference voltage Vref2 in the above-mentioned embodiment, the present invention is not limited thereto, and depending upon the electronic devices in use, it is possible to construct a hysteresis detecting circuit in which the initial reference voltage is fixed to the low reference voltage Vref1.

According to the hysteresis detecting method of the present invention, since the hysteresis detecting operation can be carried out in which the reference voltage in the initial state has to be fixed to any one of the reference voltages regardless of the magnitude of the input voltage required when the device is actuated, the present invention is suitable for use with electronic devices that are required to be small in power consumption, in particular, mobile devices. The initial period is set to the period in which the reference voltage is stabilized from the time in which the mobile device is actuated, whereby the hysteresis detection operation can be carried out reliably.

According to the hysteresis detecting circuit of the present invention, since the hysteresis detecting circuit can be constructed in which the reference voltage in the initial state has to be fixed to any one of the reference voltages regardless of the magnitude of the input voltage required when the device is actuated, the present invention is suitable for use with electronic devices which are required to be small in power consumption, in particular, mobile devices.

Since the hysteresis detecting circuit according to the present invention includes the comparing circuit having the two reference voltages and the delay circuit for delaying the input of the input voltage to the comparing circuit, the delay time is set to the time in which the reference voltage is stabilized from the time in which the electronic device is actuated, whereby the initial reference voltage can be fixed to any one of the reference voltages.

The initial period is set to the period in which the reference voltage is stabilized from the time in which the mobile device is actuated, whereby the hysteresis detection operation can be carried out reliably.

According to the mobile device of the present invention, since this mobile device includes the above-described hysteresis detecting circuit, the intensity of illumination, for example, can be detected with high accuracy and hence it can meet with a user's requirements.

Having described preferred embodiments of the invention with reference to the accompanying drawings, it is to be understood that the invention is not limited to this precise embodiment and that various changes and modifications could be effected therein by one skilled in the art without departing from the spirit or scope of the invention as defined in the appended claims.

What is claimed is:

1. A hysteresis detecting circuit comprising:
   a comparator for comparing an input signal and a reference potential;
   a switch for selecting said reference potential from a plurality of voltage sources having stabilization times; and
   a delay circuit for supplying a low level signal as said input signal for a period of time corresponding to said stabilization times of said plurality of voltage sources, wherein
   said switch selects one of said plurality of voltages sources as said reference potential during an initial state of said hysteresis detecting circuit, wherein said delay circuit comprises:
   a constant current source;
   a capacitor connected in series to said constant current source;
   an inverter connected to a connection point between said constant current source and said capacitor; and
   a transistor connected to the output of said inverter, wherein
   the drain of said transistor is connected to said input signal.

2. The hysteresis detecting circuit of claim 1, wherein a charge up time of said capacitor corresponds to said stabilization times of said plurality of voltage sources.

3. An illuminance detecting circuit comprising:
   an illuminance detecting circuit for detecting ambient illuminance; and a hysteresis detecting circuit, said hysteresis detecting circuit comprising:
 a comparator for comparing an input signal and a reference potential;
 a switch for selecting said reference potential from a plurality of voltage sources having stabilization times; and
 a delay circuit for supplying a low level signal as said input signal for a period of time corresponding to said stabilization times of said plurality of voltage sources, wherein
 said switch selects one of said plurality of voltages sources as said reference potential during an initial state of said illuminance detecting circuit, wherein said delay circuit comprises:
  a constant current source;
  a capacitor connected in series to said constant current source;
  an inverter connected to a connection point between said constant current source and said capacitor; and
  a transistor connected to the output of said inverter, wherein
  the drain of said transistor is connected to said input signal.

4. The illuminance detecting circuit of claim 3, wherein a charge up time of said capacitor corresponds to said stabilization times of said plurality of voltage sources.

* * * * *